United States Patent
Luddy

(10) Patent No.: US 6,167,651 B1
(45) Date of Patent: Jan. 2, 2001

(54) CHRISTMAS TREE WATERING DEVICE

(76) Inventor: Ryan P. Luddy, 189 Cranbrook Dr., Holden, MA (US) 01520

(*) Notice: Under 35 U.S.C. 154(b), the term of this patent shall be extended for 0 days.

(21) Appl. No.: 09/285,829

(22) Filed: Apr. 2, 1999

(51) Int. Cl.[7] .................................................. A47G 33/12
(52) U.S. Cl. ............................................................ 47/40.5
(58) Field of Search .............................. 47/40.5; 220/283; 340/620

(56) References Cited

U.S. PATENT DOCUMENTS

| | | | |
|---|---|---|---|
| D. 375,026 | 10/1996 | Ronald | D8/1 |
| 3,894,655 | * 7/1975 | Mattheis et al. | 220/283 |
| 4,993,176 | 2/1991 | Spinosa | 40/40.5 |
| 5,009,028 | 4/1991 | Lorenzana | 47/40.5 |
| 5,111,611 | 5/1992 | Elder | 47/40.5 |
| 5,118,067 | 6/1992 | Gillanders | 248/527 |
| 5,201,140 | 4/1993 | Voorhis | 47/40.5 |
| 5,369,910 | 12/1994 | Copenhaver | 47/40.5 |
| 5,473,837 | 12/1995 | Skoczylas | 47/40.5 |
| 5,473,838 | 12/1995 | Denbigh | 47/40.5 |
| 5,493,277 | * 2/1996 | Pierce et al. | 340/620 |
| 5,522,179 | 6/1996 | Hollis | 47/40.5 |
| 5,575,110 | 11/1996 | Couture | 47/40.5 |
| 5,615,516 | * 4/1997 | Brown | 47/40.5 |
| 5,791,082 | 8/1998 | Finello | 47/40.5 |
| 5,791,083 | 8/1998 | Giangrossi | 47/40.5 |
| 5,867,929 | * 2/1999 | Jung et al. | 47/40.5 |

* cited by examiner

Primary Examiner—Peter M. Poon
Assistant Examiner—Francis T. Palo
(74) Attorney, Agent, or Firm—Mirick, O'Connell, DeMallie & Lougee, LLP

(57) ABSTRACT

A device for watering a Christmas tree at its base with a fluid such as water. The device comprises a unitary, molded, generally spherical receptacle having a top pole and an opposing bottom pole, and comprising an open-top, hollow, half spherical bottom having a top lip, the bottom comprising a reservoir for receiving fluid, and having a drainage outlet substantially at the bottom pole, and a half spherical lid having a lower perimeter that matches the top lip of the bottom, the lid hinged to the bottom by a molded, living hinge. The lid may be closed against the bottom so that the lid completely covers the open top of the bottom. There is a molded structure at the top pole, for removably attaching the device to one or more of the tree branches, and a conduit for transferring fluid said fluid from the reservoir to the tree base.

4 Claims, 8 Drawing Sheets

CHRISTMAS TREE WATERING DEVICE

FIELD OF THE INVENTION

This invention relates to devices for watering a Christmas tree and more specifically to a watering device which is designed to be an ornament which hangs from one or more branches of the tree.

BACKGROUND OF THE INVENTION

Devices for watering Christmas trees are known in the art. There are large capacity devices which supply water to the tree stand over an extended period of time and are designed to sit on the floor. In an effort to blend in to the overall aesthetics associated with Christmas decorations, several of these large capacity devices are designed to simulate a Christmas present sitting under the tree. Although these devices are advantageous because they relieve the user of having to water the tree on frequent basis, these devices tend to be expensive and thus not an economical alternative to watering manually and they can be cumbersome to use.

There are also devices which are designed to hang from the branches of the tree to enable a person to regularly water the tree without having to crawl under the tree with a pitcher of water to add water to the tree stand. For example, U.S. Pat. No. 5,473,838 to Denbigh describes a Christmas tree watering device which comprises an open funnel coupled to a tubular conduit which transfers water poured into the open funnel down to the tree stand. The open funnel is attached to a branch using a spring-loaded clamp which is coupled to the funnel to a funnel mounting means which rotates around an axis perpendicular to the tree trunk to allow the funnel to hang from the branch in a generally upright position. Although this device is generally shaped like an inverted bell and includes decorative images thereon, the device does not adequately blend into the general aesthetics of the Christmas tree because the means for attaching the funnel to the tree is large and unwieldy and thus cannot be attached to a thin, readily accessible outer branch which limits the convenience of the device. In addition, because the funnel is completely open, a person can readily look into the open end of the funnel and see that the device is not an ornament.

U.S. Pat. No. 5,493,277 to Pierce et al. discloses a device for regularly watering a Christmas tree and for monitoring the water level in the tree stand. However, as with the device described in U.S. Pat. No. 5,473,838, the device disclosed in U.S. Pat. No. 5,493,277 comprises a funnel open at one end. Furthermore, only the front portion of Pierce's device looks arguably like an ornament. The back portion of Pierce's device which contains the funnel is open which limits its ability to blend in with the Christmas tree decorations. Although Pierce's device can be hung from the tree using a standard ornament hook, as do all ornaments hung using a hook, Pierce's device will rotate thus exposing the unattractive rear portion of Pierce's device. In addition, because more than half of Pierce's device contains the water monitoring components, only half of the bottom portion of Pierce's device acts as a receptacle for pouring water into the funnel which requires greater accuracy when pouring water into the receptacle.

SUMMARY OF THE INVENTION

It is therefore a primary object of this invention to provide a device for watering a Christmas tree which is capable of hanging from an outer branch of the tree and which looks more like a Christmas tree ornament.

It is a further object of this invention to provide a device for watering a Christmas tree which has a receptacle with an opening for pouring water therein which can be completely closed to resemble an ornament from all sides and from the top.

It is a further object of this invention to provide a device for watering a Christmas tree which has a large opening for pouring water therein and which resembles an ornament from all sides and from the top.

It is a further object of this invention to provide a device for watering a Christmas tree which looks like a spherical ornament from all sides and from the top.

It is a further object of this invention to provide a device for watering a Christmas tree which can be hung from a thin outside branch of the tree without using a separate ornament hook.

It is a further object of this invention to provide a device for watering a Christmas tree which can be hung from a tree branch without using a separate ornament hook and which is a single piece molded from a thermoplastic material.

A preferred embodiment of the device of this invention for watering a Christmas tree at its base with a fluid, wherein the Christmas tree comprises a plurality of branches, comprising, a receptacle having an opening for receiving the fluid and a drainage outlet through a bottom portion of the receptacle; a lid comprising a means for releasably closing the lid against the receptacle opening so that the lid completely covers the receptacle opening; a means for removably attaching the device to one or more of the branches of the tree; and a means for transferring the fluid from the drainage outlet to the base of the tree. The preferred embodiment may further comprise a means for hingedly fixing the lid to the receptacle the means for hingedly attaching the lid to the receptacle comprises a living hinge. The lid, the receptacle and the living hinge are preferably a single member molded from a thermoplastic material.

The opening of the receptacle may have an upper rim having a perimeter shape and the lid has a lower rim with a perimeter shape which corresponds to the perimeter shape of the receptacle opening. The means for releasably closing the lid against the receptacle may also comprise a notched flange extending down from the perimeter of the opening of the lid which engages a notch on the receptacle.

The means for transferring fluid preferably comprises a hollow tube with at least two opposing open ends, wherein the drainage outlet comprises a conduit which extends downward from the bottom portion of the receptacle and which engages one of the opposing open ends of the tube and wherein the tube has a length extending from the conduit to at least the base of the tree.

Although the receptacle and lid may have a variety of shapes, the receptacle may have a generally half sphere shape and the lid may have a generally half sphere shape so that, when the lid is closed against the receptacle, together the receptacle and the lid form a sphere with a top pole and an opposing bottom pole in which the drainage outlet is positioned substantially at the bottom pole, wherein at least the receptacle half of the sphere is hollow. The means for removably attaching the device to one or more of the branches of the tree may comprise an inverted hook on an outside surface of the sphere substantially at the top pole.

Another preferred embodiment of the device of the invention for watering a Christmas tree at its base with a fluid, wherein the Christmas tree comprises a plurality of branches, comprises, a receptacle having an opening for receiving the fluid and a drainage outlet through a bottom portion of the receptacle, wherein the opening of the receptacle has an upper rim having a perimeter shape;

a lid, wherein the lid has a lower rim with a perimeter shape which corresponds to the perimeter shape of the receptacle opening, and wherein the lid comprises a means for releasably closing the lid against the receptacle opening so that the lid completely closes the receptacle opening; a means for removably attaching the device to one or more of the branches of the tree; and a means for transferring the fluid from the drainage outlet to the base of the tree.

Similar to the above described embodiment, this embodiment may comprise a living hinge for hingedly fixing the lid to the receptacle; the lid, the receptacle and the living hinge are preferably a single molded member; and the means for transferring fluid may comprise a hollow tube with at least two opposing open ends, wherein the drainage outlet comprises a conduit which extends downward from the bottom portion of the receptacle and which engages one of the opposing open ends of the tube and wherein the tube has a length extending from the conduit to at least the base of the tree.

The perimeter of the upper rim of the opening of the receptacle may form a circle and the perimeter of the lower rim of the lid may likewise form a corresponding circle so that when the lid is closed against the receptacle, together the receptacle and the lid form a sphere with a top pole and an opposing bottom pole in which the drainage outlet is positioned substantially at the bottom pole.

Yet another preferred embodiment of the device of the invention for watering a Christmas tree at its base with a fluid, wherein the Christmas tree comprises a plurality of branches, comprises, a receptacle having an opening for receiving the fluid and a drainage outlet through a bottom portion of the receptacle; a lid comprising a means for releasably closing the lid against the receptacle opening so that the lid completely covers the receptacle opening; a means for hingedly attaching the lid to the receptacle; a means, for removably attaching the device to one or more of the branches of the tree, comprising an inverted hook on an outside surface of the lid; and a means for transferring the fluid from the drainage outlet to the base of the tree; wherein the receptacle, the lid and the means for hingedly attaching the lid to the receptacle are a single member molded from a thermoplastic material.

BRIEF DESCRIPTION OF THE DRAWINGS

Other objects, features and advantages will occur to those skilled in the art from the following description of the preferred embodiments and the accompanying drawings in which.

DETAILED DESCRIPTION OF THE PREFERRED EMBODIMENTS

The device of the invention for watering a Christmas tree generally comprises a receptacle having an opening for receiving the water and a drainage outlet through the bottom portion of the receptacle; a lid comprising a means for releasably closing the lid against the receptacle opening so that the lid completely covers the receptacle opening; a means for removably attaching the device to a branch of the tree; and a conduit for transferring the water from the drainage outlet to a tree stand at the base of tree. The lid is generally fixed to the receptacle by a living hinge.

Figure 1:
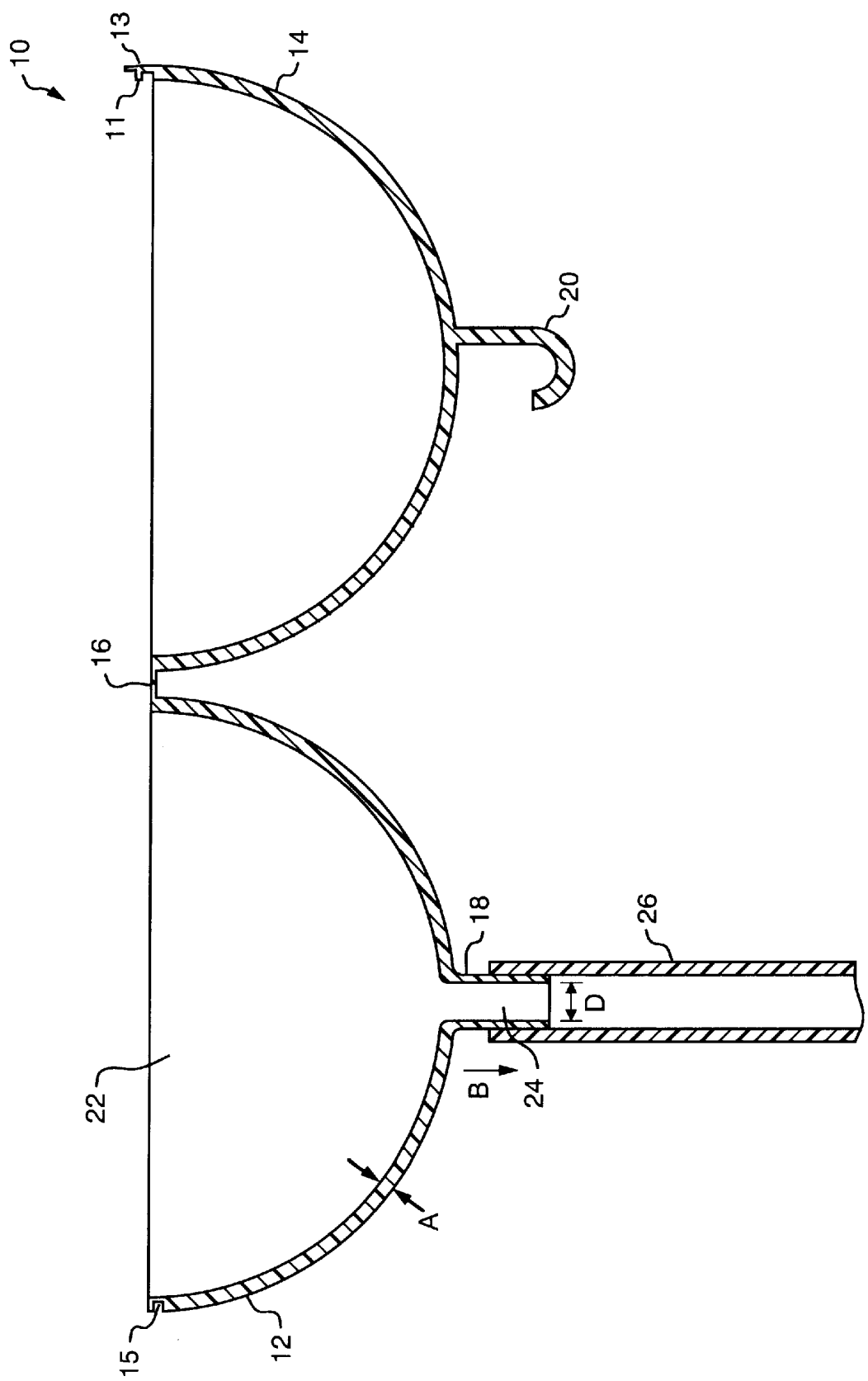
FIG. 1 is a partial side view of the device of the invention shown in a fully open position.
Figure 5:
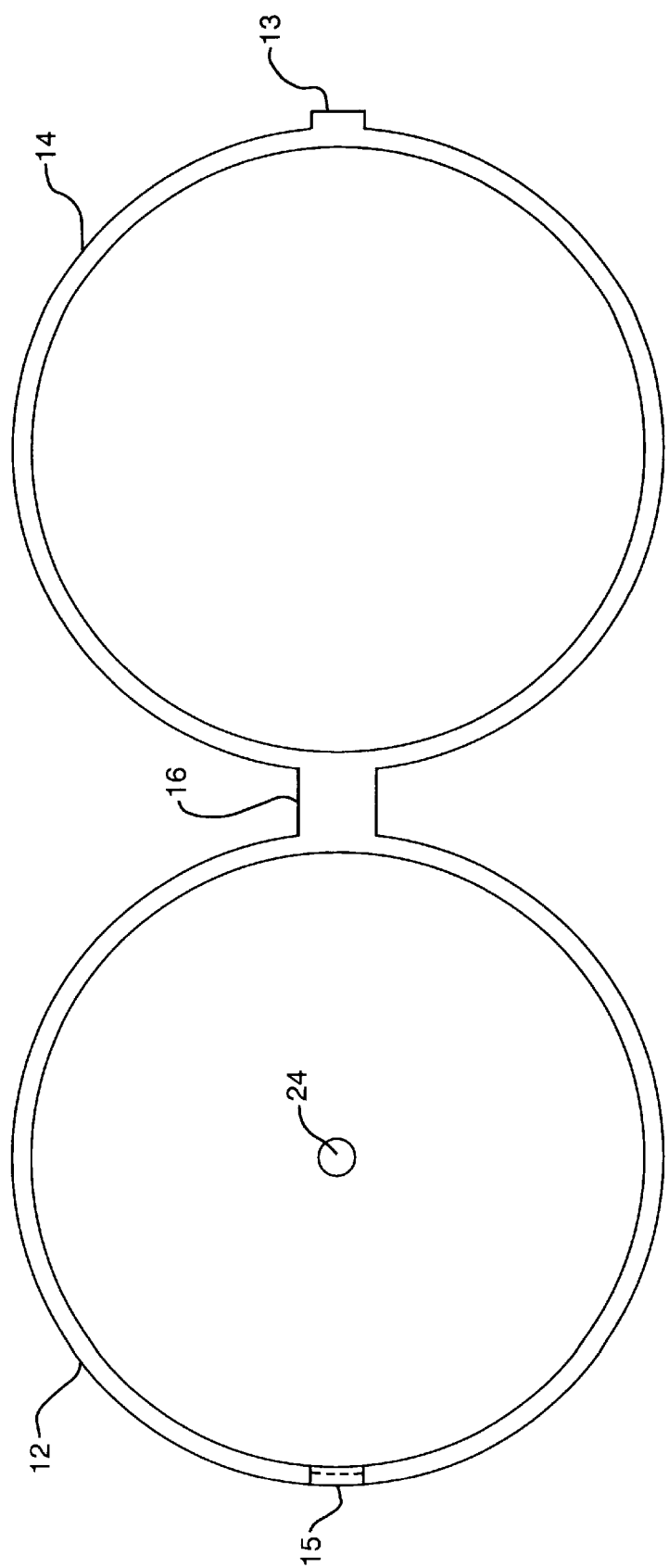
FIG. 5 is a top view of the device of FIG. 1.
Figure 6A:
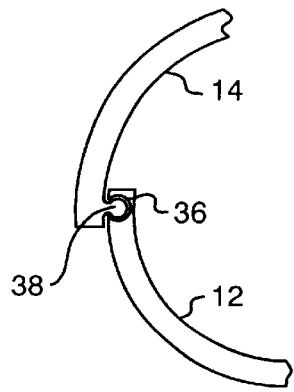
FIG. 6A is a partial cross-sectional view of a preferred embodiment of the means for releasably closing the lid of the device of the invention against the receptacle of the device of the invention.
Figure 7:
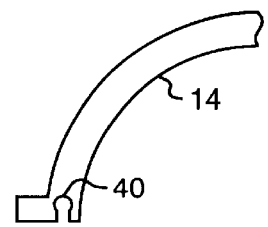
FIGS. 7 and 8 are partial cross-sectional views of other preferred embodiments of the means for releasably closing the lid of the device of the invention against the receptacle of the device of the invention.
Figure 6B:
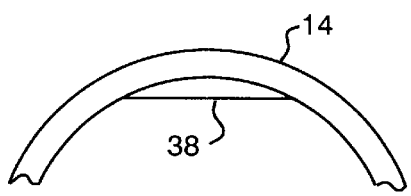
FIG. 6B is a partial bottom view of the means for releasably closing the lid of FIG. 6A.

There is shown in FIG. 1, device 10 according to this invention which can be hung from an outer branch of a Christmas tree and is useful for watering the tree without having to crawl under the lowest branches of the tree with a pitcher of water to add water to the tree stand. The bottom portion of device 10 is receptacle 12 which is a half sphere having a substantially round cross-section with drain outlet 24 centered in the bottom of receptacle 12 as shown in FIG. 5. Receptacle 12 should be substantially hollow to provide a large opening 22 to enable the user to readily pour water into opening 22. Opening 22 is preferably 4 inches in diameter. Drain outlet 24 leads into conduit 18 which is a hollow tubular extension of drainage outlet 24. Conduit 18 is preferably about ½ inch in length. The annular wall of conduit 18 tapers inward and downward in the direction of arrow B from drain outlet 24 at about a 5 degree angle. The inside diameter D of conduit 18 at its lower end is about 0.166 inches. Hollow tube 26 is pushed up and around the lower end of conduit 18. The inner diameter of tube 26 will depend on the outer diameter of conduit 18 and the elasticity of tube 26, however, the inner diameter of tube 26 should be large enough to fit around the outside of conduit 18 but small enough to stay in place due to the elastic nature of tube 26. Tube 26 should be long enough to extend from an upper branch of the Christmas tree to the base of the tree.

The walls of receptacle 12 and lid 10, as shown by arrows A, are about 0.70 inches thick. The wall thickness can be adjusted as needed depending on the strength and rigidity of the materials used. Receptacle 12 and lid 10 are preferably made out of polypropylene.

Figure 3:
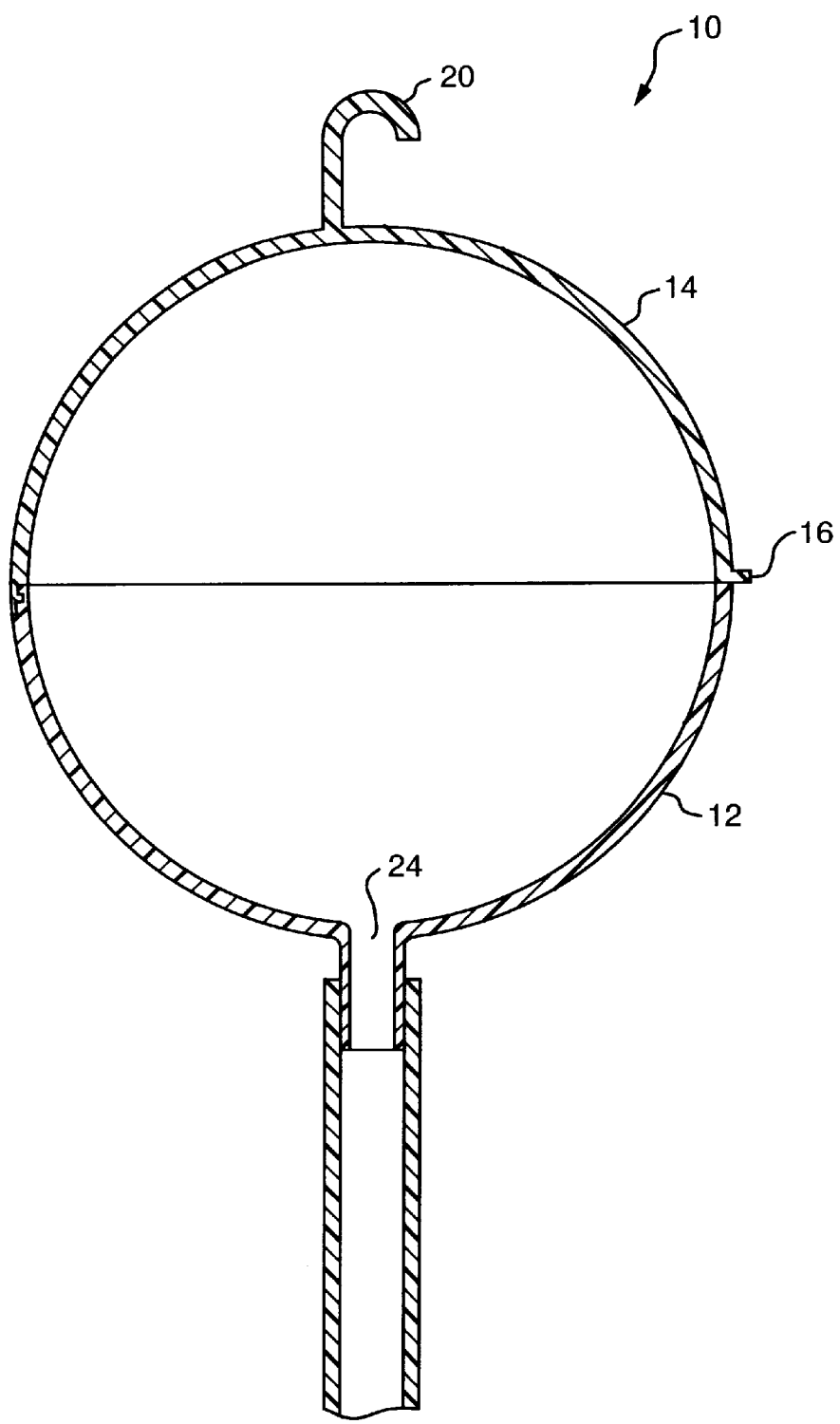
FIG. 3 is a partial side view of the device of FIG. 1 in a closed position.

Receptacle 12 and lid 14 are preferably attached to each other along one edge by living hinge 16. A means for releasably closing lid 14 against receptacle 12 is also provided along an edge of receptacle 12 and lid 14 opposite from hinge 16. The means for releasably closing lid 14 may comprise any number of mechanical locking devices including notch 11 on flange 13 on lid 14 and corresponding groove 15 on receptacle 12. In this embodiment, when lid 14 is closed against receptacle 12, notch 11 engages groove 15 as shown in FIG. 3. Device 10 can be opening by lifting up on the tip of flange 13 to disengage notch 11 from groove 15.

Figure 4A:
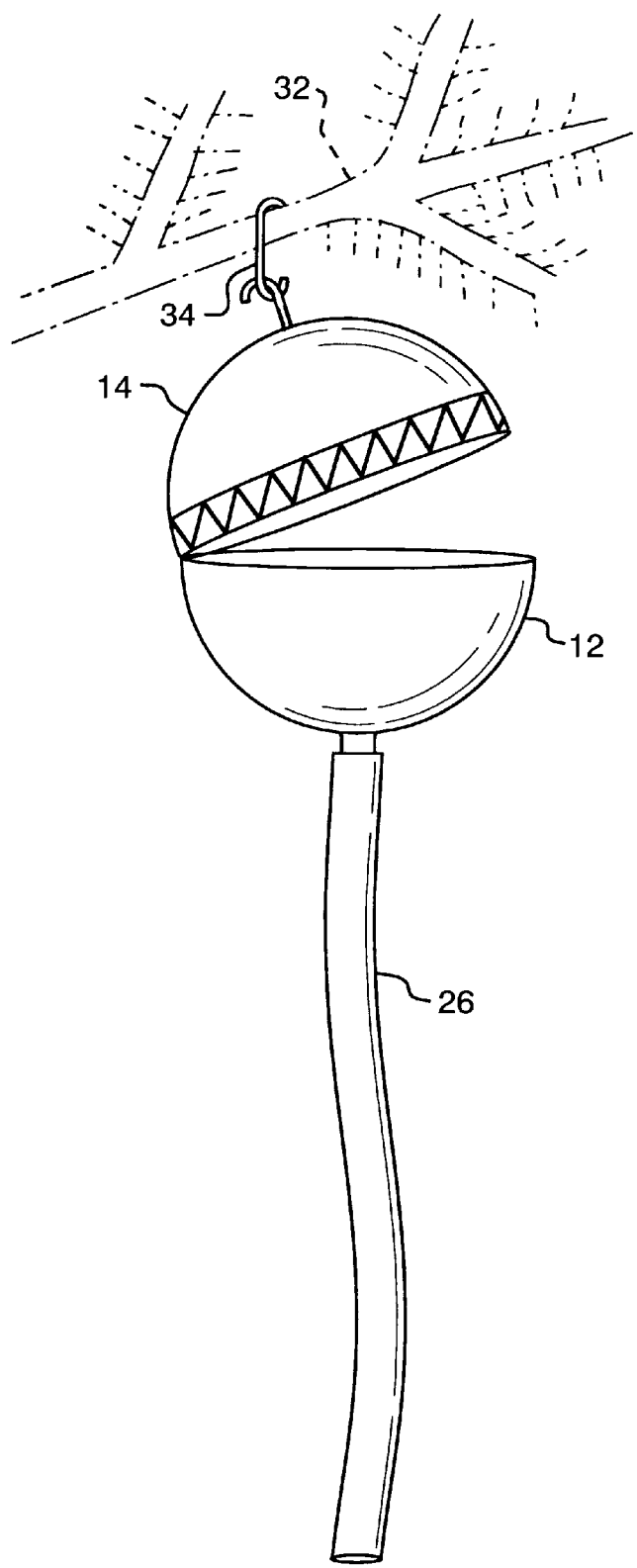
FIG. 4A is a perspective partial view of the device of FIG. 1 shown open and hanging from a branch of a Christmas tree.

Inverted hook 20 is provided on the top and outside surface of lid 14 to enable a user to hang device 10 directly from a tree branch. Alternatively, if desired, hook 20 can be used in connection with ornament hook 34 to hang device 10 from tree branch 32 (FIG. 4A). Except for tube 26, device 10 is preferably a single molded piece molded from a thermoplastic material such as polypropylene.

Figure 2:
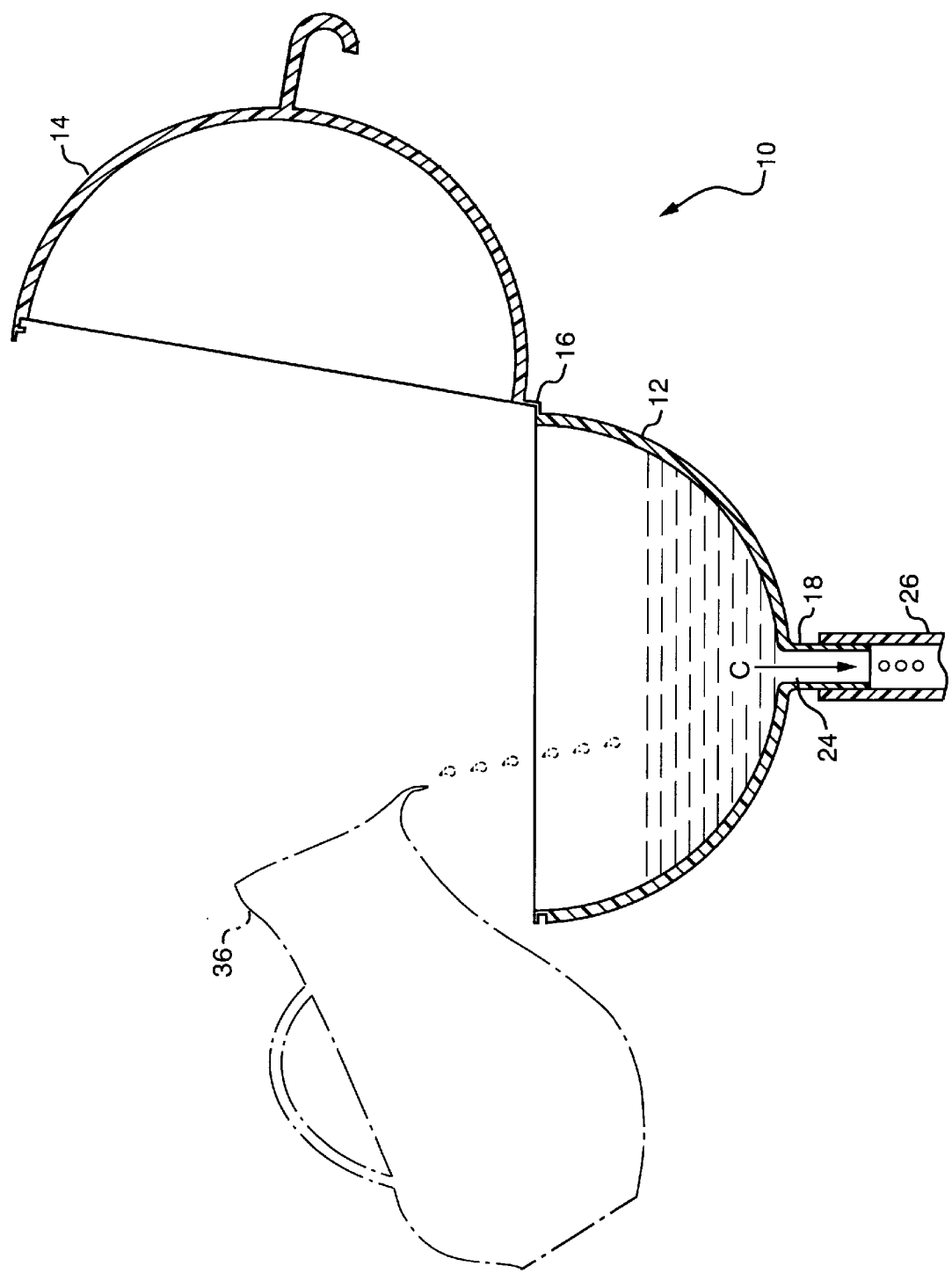
FIG. 2 is a partial side view of the device of FIG. 1 as water is being poured into the device.
Figure 4B:
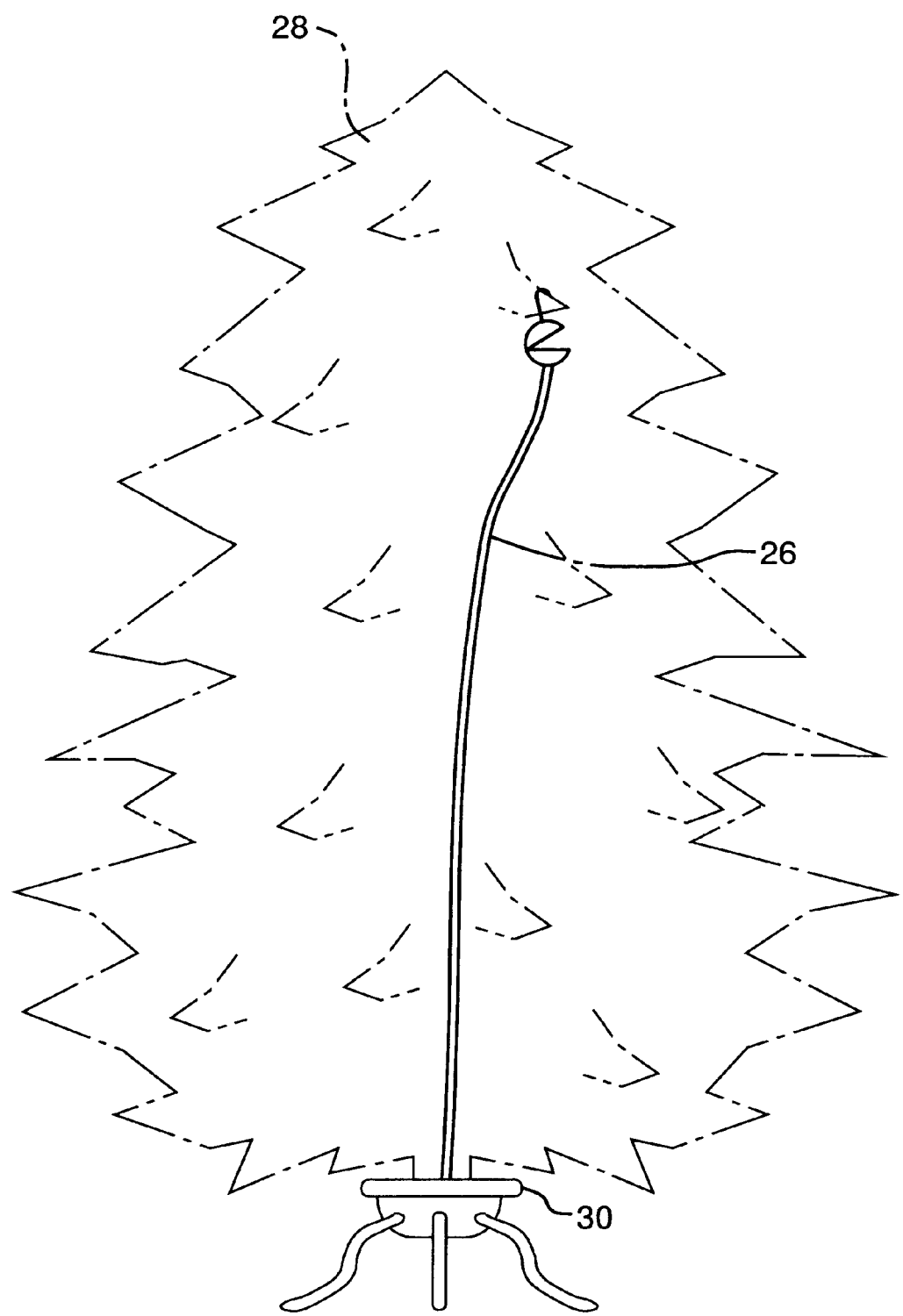
FIG. 4B is a perspective view of the entire device of FIG. 4A showing the device hanging from an upper branch and the conduit of the invention extending from the upper branch down to the tree stand at the base of the tree.

As shown in FIG. 2, device 10 is used by lifting up lid 14 along hinge 16 and pouring water into opening 22 using pitcher 36 or any other convenient transporting means. The water drains out of receptacle 12 through drainage outlet 24 and conduit 18 in the direction of arrow C into tube 26 and down to tree stand 30 at the base of tree 28 (FIG. 4B).

Alternative means for releasably closing lid 14 against receptacle 12 are shown in FIGS. 6A, 6B, 7 and 8. The means for releasably closing shown in FIGS. 6A and 6B comprising flange 38 on the inside surface of lid 14 and groove 36 on the outside surface of receptacle 12. In the embodiment shown in FIG. 7, the means for releasably closing comprises keyhole 40 and corresponding key 42. The diameter of the lower portion of keyhole 40 should be slightly smaller than the outer diameter of the upper portion of key 42.

Figure 8:
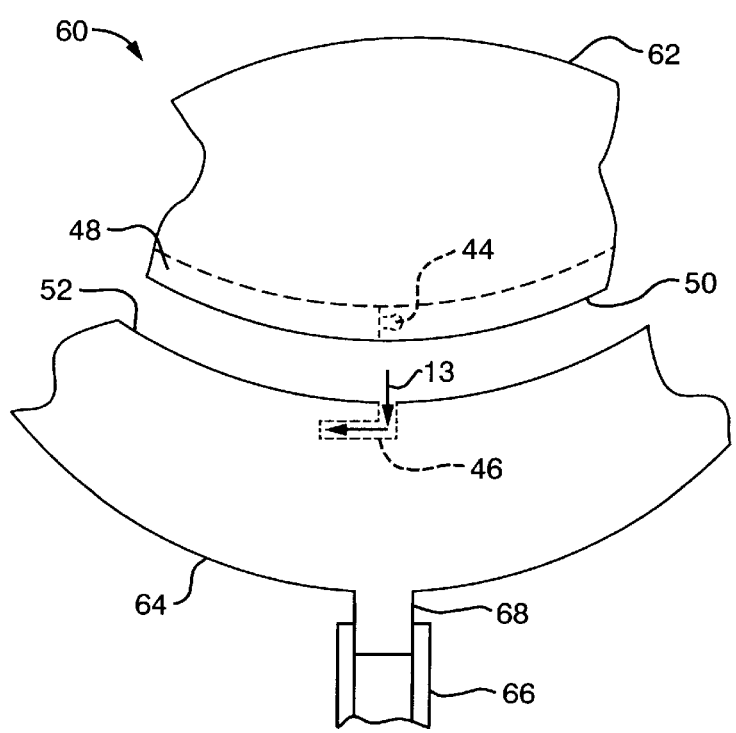

In the embodiment shown in FIG. 8, device 60 comprises lid 62 and receptacle 64 including conduit 68 and tube 66. The means for releasably closing lid 62 against receptacle 64 comprising notch 44 on the inside surface of recessed perimeter 48 of lid 62 proximate lower rim 50 and L-shaped groove 46 proximate upper rim 52 of receptacle 64. The inside diameter of recessed perimeter 48 should be slightly larger than the outside diameter of upper rim 52. An identical notch 44 and groove 46 are provided on the opposite side of device 60. To close device 60, notch 44 is inserted into the top portion of L-shaped groove 46 and press down and in a clockwise direction as shown by arrow B. In this embodiment, notches 44 and grooves 46 serve the dual purpose of releasably closing the lid against the receptacle and as a means for fixing the lid to the receptacle without using a hinge. To open device 60, lid 62 is turned in a counter-clockwise direction and lifted upwards out of groove 46.

Figure 9:
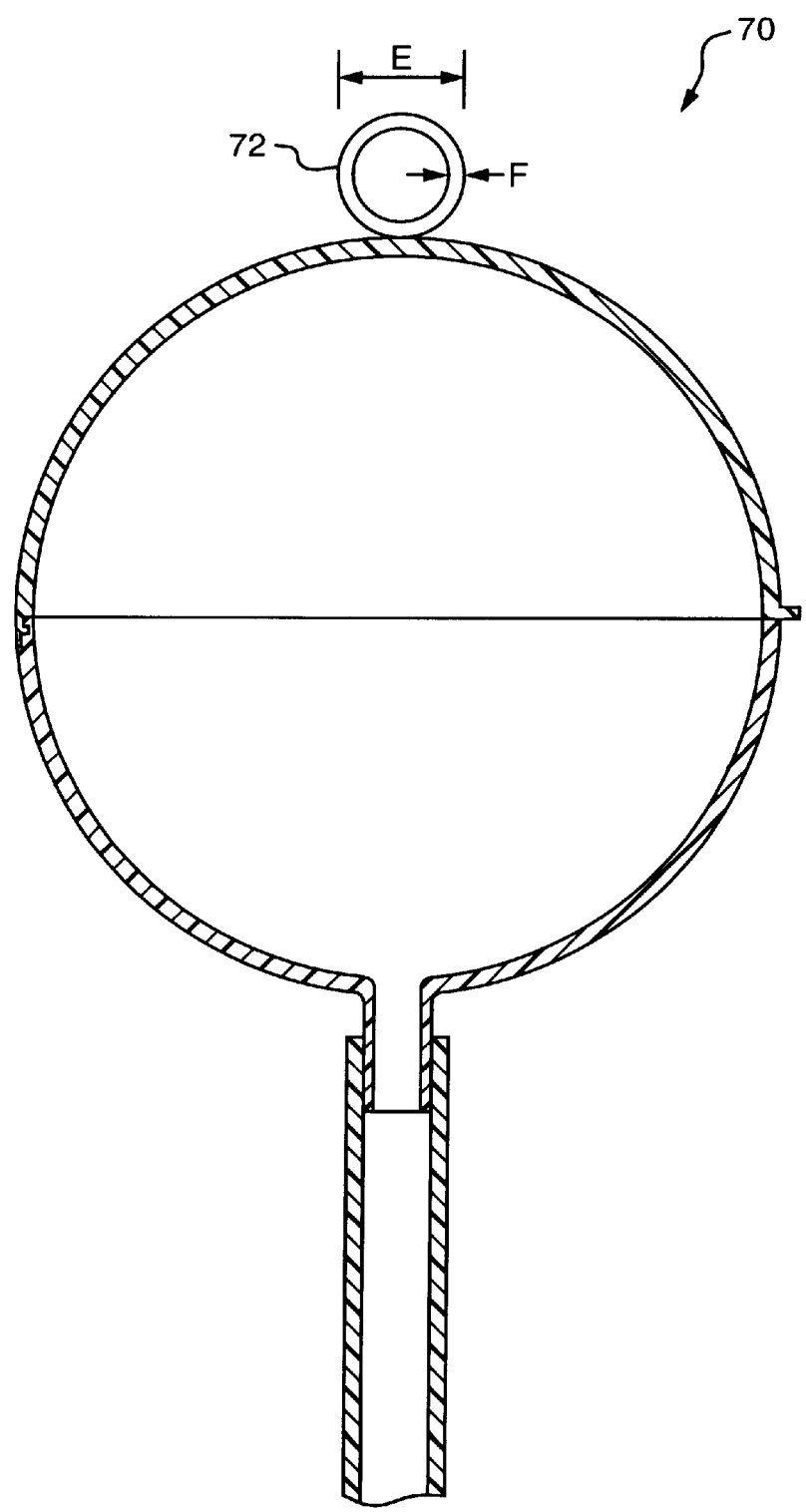
FIG. 9 is a partial side view of of the device of the invention with another preferred embodiment of the means for removably attaching the device of the invention to one or more branches of a tree.

FIG. 9 shows another preferred embodiment of the means for removably attaching the device of the invention to one or more branches of a tree. Specifically, loop 72 is molded to the top of device 70. Loop 72 preferably has an outside diameter E of about ⅜ inches and a wall thickness F of about 0.078 inches. Loop 72 is used, together with a standard ornament hook, to hang device 70 to a tree branch.

Although the preferred embodiment of the device of the invention is spherical in shape, the device may taken on any suitable ornament shape as long as the receptacle portion of the device is large enough to accommodate a large opening and the lid complete covers the receptacle opening. The device is not limited to the materials used to make the preferred embodiment and may be adapted for use with other materials typical of ornaments and decorations as desired as long as the materials are light enough to hang from an accessible Christmas tree branch, strong enough to hold the device components together and durable enough to withstand regular handling.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A device for watering a Christmas tree at its base with a fluid, wherein said Christmas tree comprises a plurality of branches, comprising, a unitary, molded, generally spherical receptacle having a top pole and an opposing bottom pole, and comprising an open-top, hollow, half spherical bottom having a top lip, said bottom comprising a reservoir for receiving fluid, and having a drainage outlet substantially at said bottom pole; and a half spherical lid having a lower perimeter that matches said top lip of said bottom, said lid hinged to said bottom by a molded, living hinge; said receptacle further comprising a means for releasably closing said lid against said bottom so that said lid completely covers said open top of said bottom;

a molded structure at said top pole, for removably attaching said device to one or more of said branches of said tree; and a means for transferring said fluid from said drainage outlet to said base of said tree.

2. The device of claim 1, wherein said means for releasably closing said lid against said bottom comprises a notched flange extending down from said lower perimeter of said lid which engages a notch on said top lip.

3. The device of claim 1, wherein said means for transferring fluid comprises a hollow tube with at least two opposing open ends, wherein said drainage outlet comprises a conduit which extends downward from said bottom of said receptacle and which engages one of said opposing open ends of said tube and wherein said tube has a length extending from said conduit to at least said base of said tree.

4. The device of claim 1, wherein said molded structure for removably attaching said device to one or more of said branches of said tree comprises an inverted hook on the outside surface of said sphere.

* * * * *